April 25, 1933.   L. FOOTE   1,905,558
MEASURING DEVICE
Filed Sept. 14, 1928
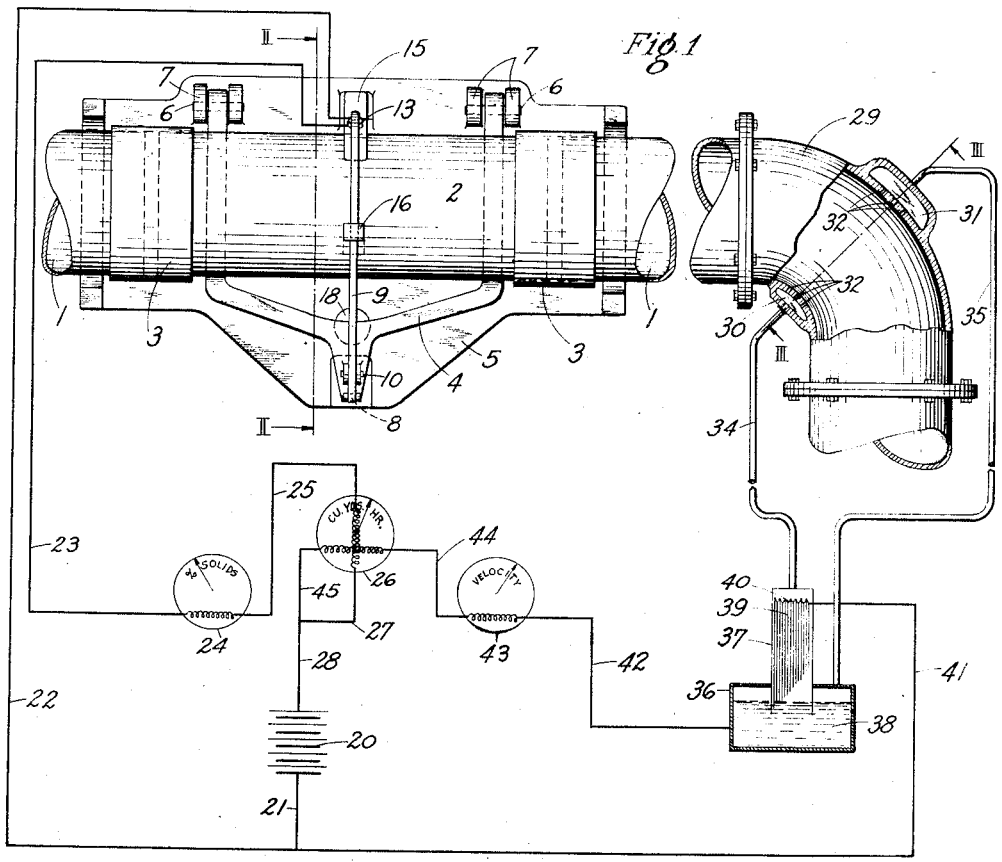
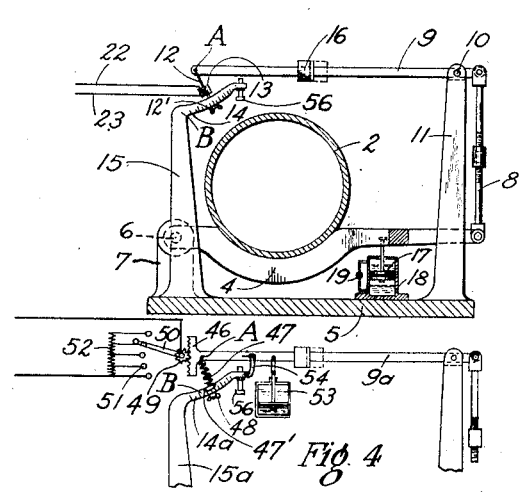
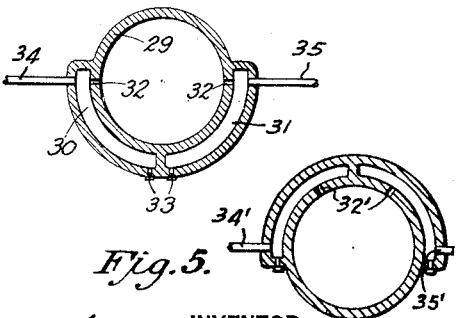
INVENTOR
Leonard Foote
BY
Richey & Watts
ATTORNEYS Patented Apr. 25, 1933

1,905,558

UNITED STATES PATENT OFFICE

LEONARD FOOTE, OF PEDRO MIGUEL, CANAL ZONE

MEASURING DEVICE

Application filed September 14, 1928. Serial No. 306,080.

This invention relates to hydraulic conveying apparatus and is particularly applicable to such apparatus as is used on dredges and the like.

An object of the invention is to provide means for determining amounts of material conveyed while the same is passing continuously through a conveyor of the hydraulic type.

Other objects will hereinafter appear.

The invention will be better understood from the description of one practical embodiment thereof illustrated in the accompanying drawing, in which Fig. 1 is a plan view of parts of a hydraulic conveyor such as is used on dredges, showing in somewhat diagrammatic manner the apparatus for determining the material passing therethrough;

Fig. 2 is a section thereof taken on the line II—II of Figure 1;

Fig. 3 is a sectional view taken on the line III—III of Figure 1; and

Fig. 4 is a fragmentary view similar to Fig. 2 but showing a different means for indicating the weight of material being handled.

Fig. 5 is a view showing an alternate connection of the ports.

The apparatus shown comprises a stationary conduit 1, which is provided with a movable section 2, connected thereto at both ends by rubber or other flexible sleeves 3, the movable portion being supported upon a cradle 4 pivoted to a supporting base 5 by pivot pins 6 supported in lugs 7 formed upon the base. The other side of the yoke is connected to an adjustable link 8, this adjustment being used to bring point A to the geometric center of arc B at the zero reading of the indicator 24. The link 8 is connected to one end of a yard arm or lever 9 which is fulcrumed at 10 near this end to a supporting stanchion 11 formed upon the base. The other end of the lever is connected by a link 12 to a variable resistance or rheostat 13 which may conveniently be of the carbon pile type. The other end of the rheostat is adjustable along a sector 14, the under side of the sector lying along arc B, supported upon a stanchion 15 carried by the base, for a purpose to be hereinafter described.

A weight 16 is movable along lever 9 to compensate for the weight of section 2 and the conveying fluid therein. A piston 17 is connected to the cradle and operates in a cylinder 18 carried by the base, a by-pass and valve 19 establishing communication between the ends of the cylinder so that the piston and cylinder operate as a dashpot in damping motion of the cradle.

The dashpot may be attached to the lever 9 as shown at 53 in Fig. 4 instead of to the cradle, if desired.

A constant potential source of electricity, shown as a battery 20, furnishes current which passes through conductors 21 and 22 to the rheostat 13 and thence returns through conductor 23 to a meter 24 which is calibrated to indicate directly the percentage of solid material contained in the water within movable section 2, the percentage by volume of solid material being in direct proportion to the increase in weight of the contents of this section.

From this meter a conductor 25 leads to a meter 26 from which the current passes, through conductors 27 and 28, back to the battery.

The weight 16 may be adjusted by sliding along lever 9 to compensate for differences in the density of the water flowing through the conduit, as for the difference between fresh and salt water.

The rheostat may be adjusted along sector 14 to vary the rheostat operation in accordance with the density of the solid material being handled in order that the reading of the meter remain constant, the reading being in cubic feet, the sector being conveniently calibrated in pounds per cubic foot of wet material. Obviously, however, it may be calibrated for dry material or for both wet and dry material. An adjusting nut 12' is provided for zero adjustment of meter 24.

When the rheostat extends vertically the apparatus is set for the heaviest material for which it may be adjusted, while for the extreme case of material of only the density of water the rheostat should be set horizontally, and for all other densities it will be set at an angle, as is indicated.

The vertical motion of the movable section of pipe 2 is slight and is not, therefore, materially affected or constrained by the flexure of the rubber sleeves.

In Figure 4 another arrangement of the yard arm, sector and the like, are illustrated, in which a spring load is substituted for the compression of the carbon pile, the resistance in this case being controlled by an ordinary rheostat having taps taken off at intervals, and a switch arm to contact with the taps. In this modification the yard arm 9a terminates in a segmental rack 46. A tension spring 47 provides a load on the yard arm, the end of the spring being adjustable along sector 14a and adapted to be clamped into position by clamp 47' and have its tension adjusted as by wing nut 48. A pinion 49 is operated by the segmental rack and carries a contact arm 50 which passes over contacts 51 of the rheostat 52, so that the resistance of the rheostat is inversely proportional to the weight of material being conveyed through the movable section 2 of the conduit.

Obviously with the use of a spring load, if it is desired to vary the resistance for different weights, so that amounts of materials of different specific gravity may be indicated, it would be possible to substitute springs 47 of different strengths rather than move the end of the spring along the sector 14a.

If desired, a pointer 54 may be carried by the stanchion 15a or sector 14a to facilitate the setting of point A at the center of arc B.

An adjustable stop 56 may be threaded through sector 14 or 14a to limit the downward movement of the yard arm below zero position when the discharge line is empty. This stop when secured in proper adjustment could be used in place of the indicator, just above described, in setting the apparatus at its proper zero position.

At another point in the conveyor conduit is positioned an elbow 29 provided on its inner and outer sides with chambers 30 and 31 respectively, each of which communicate with the interior of the elbow by a plurality of ports 32.

Due to the centrifugal force created in the passage of fluid around elbow 29, greater pressures are created toward the exterior than toward the interior of the bend, and the differences in pressure are indicated through the manometer and meters below described.

The chambers are conveniently made as shown in Figure 3, by being cast integrally with the elbow and are provided at their bottoms with plugged openings 33, through which solid material collecting in the chambers may be withdrawn. Two tubes 34 and 35 communicate with the upper portions of the chambers 30 and 31 respectively and extend to a manometer comprising a tank 36 having an upwardly extending compartment 37. Within this tank and compartment is a quantity of mercury or the like 38, and extending downwardly in the compartment are stepped conductors 39 connected together by a resistance wire or the like 40, so that as the mercury rises in the extension the resistance to the passage of current through the manometric device is reduced. Conductors 41 and 42 are connected to the tank and to the resistance 40, the conductor 41 being connected to conductor 21 from the battery and conductor 42 being connected to a meter 43, which is calibrated to indicate the velocity of the fluid through the conduit.

From this meter a conductor 44 leads to the meter 26, and from meter 26 a conductor 45 extends to conductor 28 leading from the battery.

While the chamber 31 is shown as connecting with the extreme outer side of the elbow, it will be obvious that the ports 32 to this chamber may be at any other point, for instance, at some point above the center of the elbow as is best illustrated in Fig. 5, at 32', and wherein the tubes 34' and 35' serve a similar purpose to the tubes 34 and 35, and the meters may be properly calibrated to indicate the velocity which is a function of the difference in pressure between this point and the inside of the bend. This may be advantageous due to the possibility of wear on the outer portion of the elbow and the greater possibility of solid material lodging within the ports 32 at this point.

Meter 26 is constructed in such a manner as to indicate a function of both the velocity of the mixture and the percentage by volume of solids therein and, therefore, may be calibrated to indicate directly cubic yards per hour conveyed through the apparatus.

Any variation in the reading of the manometer due to differences in density of the fluid within the elbow will be negligible as the errors therein are in the proportion of the square root of the ratio of the different densities of fluid, and no adjustment therefor is normally required for this part of the apparatus.

While the source of electric current for operating the instruments is illustrated as a battery, it will be obvious that any other source of constant potential may be used, it being quite essential for accuracy of readings that the potential be not varied while the apparatus is in operation and that it be that for which the meters are calibrated. It is also essential that the resistances 40 and 13 be so proportioned that the currents flowing in circuits 42 and 23 respectively will be in direct proportion to the velocity and percent of solids respectively, in order that meter 26 will function properly, although in case meter 26 were omitted the meters 43 and 24 could be calibrated with regard to such currents.

While I have described the illustrated embodiment of my invention in some particularity obviously many variations and modifications thereof will readily occur to those skilled in the art to which this appertains and I do not, therefore, limit myself to the precise details shown and described but claim as my invention all embodiments thereof coming within the scope of the appended claims.

I claim:

1. Measuring apparatus comprising a conduit including a movable section and relatively stationary adjacent sections, flexible joints connecting said sections, a movable supporting member bearing said movable section, a counterpoise for said latter section and the material passing therethrough, said counterpoise being connected to said supporting member, an indicator, means connecting the indicator to the supporting member, and adjustable means associated with said member for varying the indication of said indicator to compensate for the specific gravity of the material passing through the conduit.

2. A measuring device for hydraulic conveyors comprising a movable pipe section interposed in the conduit through which the material passes, and flexible joints connecting the ends of said section to the other parts of the conduit, a stationary frame, a cradle pivoted to said frame and supporting said movable section, a yard arm pivoted to said frame, means connecting said cradle to said yard arm, a weight adjustable along said yard arm, and an indicator rheostat pivotally connected to said yard arm and engaging said frame so as to be angularly adjustable to the arm.

3. In a fluid conveyor, measuring apparatus comprising a movable section in the conveyor conduit, means connecting the ends of said movable section to the conveyor conduit, weighing means for said section and contents and an indicator, means connecting said indicator to said weighing means, said indicator being calibrated to indicate the weight of material in said section, an angularly disposed portion of said conduit adjacent said section, a manometer, means connecting said manometer to said angularly disposed portion at points of different radius, a meter, means operatively connecting said meter to said manometer, said meter being calibrated to indicate the velocity of the material through said angular portion, and a meter, means connecting said last named meter to said weight indicator and said velocity indicating meter so that said last named meter will be responsive to the forces actuating the said weight indicator and said velocity indicating meter proportionately calibrated to indicate the amount of solid material per unit time passing through the conduit.

4. In a fluid conveyor, measuring apparatus including a movable conveyor section, stationary sections, sleeves connecting said stationary sections in the movable section, a scale responsive to the weight of the contents of said section, an angularly disposed section, a manometer, means operatively connecting said indicator to said angular section to indicate differences in pressure at points of different radius in said angularly disposed sections, a rheostat controlled by said scale, a second rheostat controlled by said manometer, a circuit including a source of electric current supplying current through both said rheostats, a meter in said circuit and connected with the first mentioned rheostat for indicating the percentage of solid material in the movable section, a second meter in said circuit and associated with the second mentioned rheostat for indicating the velocity of material through the angularly disposed section, a third meter in said circuit operatively connected with both of said first and second meters and to said source and indicating a function of the resistance of both rheostats and calibrated to indicate the quantity of material per unit time passing through the conveyor.

5. In a device for indicating the amount of solids passing through a dredge line comprising a dredge line having a movable section, stationary sections on each side of the movable section and flexible joints connecting the sections, a weighing support for the movable section including a counterbalance adjustable to compensate for varying specific gravity of a fluid conveying medium, a meter, means operatively connecting said meter to the weighing support to indicate the weight of the solids passing through said section, means to indicate the velocity of the material through the section, a third indicator, and means operatively connecting said third indicator to the first and second meters to indicate the volume of solid material passing through said section.

In testimony whereof I hereunto affix my signature this 6th day of August, 1928.

LEONARD FOOTE.